A. T. BARNES.

Horse Hay-Rake.

No. 3,685. Reissued Oct. 26, 1869.

Witnesses;
Victor Hagmann
A. K. Ellsworth

Inventor;
A. T. Barnes
per Munn & Co
Attorneys.

N. PETERS, PHOTO-LITHOGRAPHER, WASHINGTON, D. C.

UNITED STATES PATENT OFFICE.

A. T. BARNES, OF TIFFIN, OHIO, ASSIGNOR TO THE TIFFIN AGRICULTURAL WORKS, OF SAME PLACE.

IMPROVEMENT IN HORSE HAY-RAKES.

Specification forming part of Letters Patent No. 75,836, dated March 24, 1868; Reissue No. 3,685, dated October 26, 1869.

*To all whom it may concern:*

Be it known that I, A. T. BARNES, of Tiffin, in the county of Seneca and State of Ohio, have invented certain new and useful Improvements on Revolving Horse Hay-Rakes; and I do hereby declare that the following is a full, clear, and exact description thereof, reference being had to the accompanying drawings, making part of this specification, in which—

Figure 1:
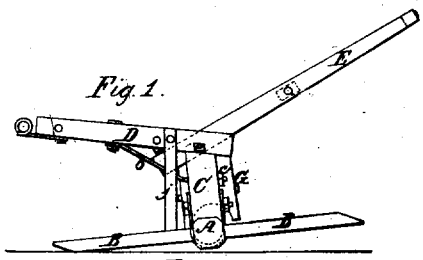
Figure 3:
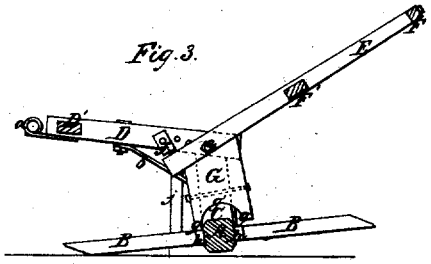
Figure 2:
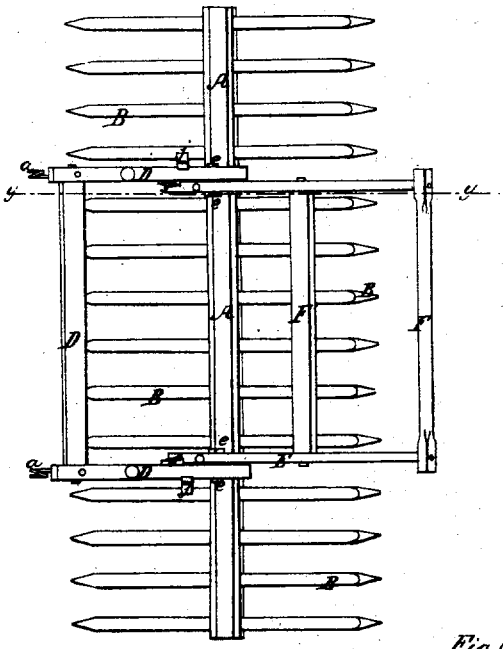
Figure 4:
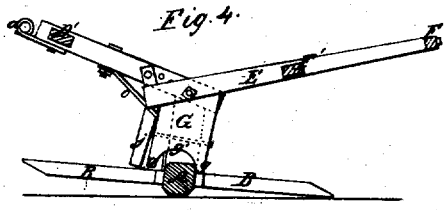
Figure 5:
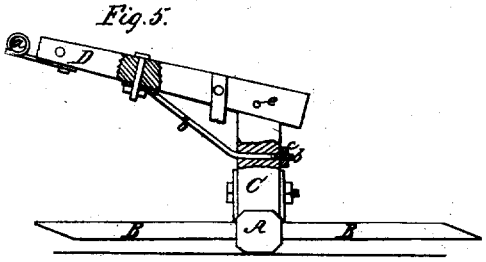
Figure 6:
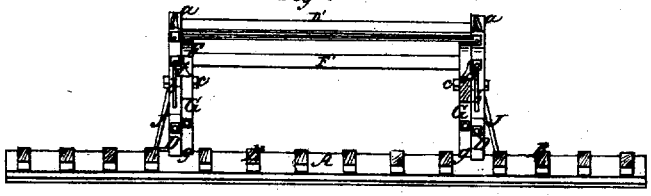

Figure 1 is an elevation of one side of the improved rake in a position for operation. Fig. 2 is a top view of the rake. Figs. 3, 4, and 5 are sectional views of the rake in different positions, and Fig. 6 is a front elevation.

Similar letters of reference indicate corresponding parts in the several figures.

This invention relates to certain novel improvements on that class of horse hay-rakes which are not mounted upon wheels, but which have the rake-teeth projecting from two sides of a head, which head is applied to a frame constructed in such manner that when a load is gathered upon one set of teeth such load can be discharged by allowing the rake-head to turn one-half around, which will bring a new set of teeth into play. This class of rakes is subjected to considerable strain, owing to their peculiar construction, and also to their having to be dragged upon the ground. The weakest points of such rakes are at the knees or joints, which are formed by uniting the draft-bars to the standards of the rake-heads, and such joints, under the old mode of construction, soon work loose and derange the working of the whole machine.

The main object of my invention is to relieve the knee-joints of revolving rakes from undue strain by the application of braces to the rake-frames in such manner that most of the draft will be transferred through the braces to the standards, said braces being carried through the standards and provided with adjusting-nuts, whereby the knee-joints can be readily tightened should they become loose, as will be hereinafter described.

Another is to strengthen the joint connecting the handles or arms and the tripping-clutch by the insertion of a bolt, extending transversely through the handle or arm and obliquely into the tripping-clutch, in such a manner as to connect said parts more firmly together than heretofore.

Another object of my invention is to provide for strengthening the arched tripping-clutches which are upon the pivoted arms of the rake-frame, so that said clutches shall not be liable to split should they be made of one or two pieces of wood, as will be hereinafter described; and still another object is so to construct and apply the stop that limits the movement of the handle or arm on its pivot with relation to the draw-bars that said stop will not wear into the body of the handle or arm and interfere with the working adjustment of said parts.

To enable others skilled in the art to understand my invention, I will describe its construction and operation.

The rake-head A, with its two sets of rake-teeth, B B, may be constructed in the usual well-known manner of making this class of rakes. This head is so connected to the lower ends of two vertical standards, C C, that it will revolve freely, so that first one set of teeth and then the other set may be brought into raking position in a manner common to revolving rakes which are not mounted upon wheels. The upper ends of the standards C C have tenons formed on them, which are inserted into mortises formed in the lower edges and near the rear ends of the draw-bars D D. These bars D are connected together near their front ends by means of the transverse brace D′, and on the front ends of these draw-bars hooks *a a* are secured, by which the horses are attached to the machine. The standards C and draw-bars D are secured together so as to form angles or knees, as shown in the drawings, which knees are strengthened by means of tie-braces *b b*, that extend backward and downward from points forward of the standards C C and pass through these standards, receiving nuts *c c* upon their rear ends, as shown in the drawings. The front ends of these braces *b* have eyes formed on them, through which bolts pass, which also pass through the bars D and secure the front ends of the braces rigidly to these bars. By thus applying braces *b b* to the knees formed by the standards and draft-bars the strain caused by the draft upon said bars D in raking will be transferred to the standards below the knees, and the latter will not be subjected to undue strain, and by having the rear ends of said braces *b b* pass through the standard C, and provided with nuts on their rear ends, I provide for tightening the knee-joints when they wear loose. Thus it will be seen that I not only strengthen the knee-joints and the entire rake-frame by means of braces *b b*, but I can conveniently use these braces for keeping said joints rigid. Through the knee-joints holes are made transversely, through which the bolts *e* are passed, that receive upon their inner ends nuts, as shown in the drawings. These bolts also receive upon them, and serve as pivotal connections for, the arms E E, which are used in managing the machine. These arms are connected together by means of a handle, F, and cross-bar F′, as shown in Fig. 2.

To the pivoted arms E pieces G G are secured in vertical planes over the rake-head A, the lower ends of which pieces are constructed with bearing-points *g g*, formed by cutting semicircular pieces out of said ends, and thus leaving arches *g′*. These pieces G form tripping-clutches for the rake, when used in connection with the stop-pins *h h* projecting from the rake-head, as shown in Figs. 3 and 4. If desirable, the lower arched ends of the pieces G may be shod with metal to prevent rapid wear.

The arms E E project short distances forward of their pivotal connections *e*, and extend beneath square-faced stops or lugs *f f*, which are each provided with a flange and secured fast to the inner surfaces of the draw-bars D, as shown in Figs. 2, 3, and 4, the flange bearing against the under side of the draw-bars. These stops serve as abutments, against which the forward ends of arms E are pressed in the act of bringing the rake-teeth into a position for raking after every discharge of a load. These stops *f* afford a purchase to enable the attendant to throw the draw-bars upward sufficiently high to allow the spring-legs *j j* to catch upon the tops of the rake-teeth nearest to them. They are placed obliquely on the side of the draw-bars, so that the upper surface of the arms E E will come square against their flat broad face, and will last for years without being sufficiently worn away to derange the working adjustment of the machine. Heretofore round pins or bolts have been employed, inserted into the side of the draw-bars and projecting out, so that the arms E will catch under them. Such pins soon wear into the wooden bars E and enable them to turn far enough on their pivots to interfere with the action of the springs *j j* and render it necessary to stop the team in order to set the rake.

My improved stop entirely obviates the difficulty complained of, and enables the rake to be used for years without getting out of order. The legs *j* are secured to the sides of the draw-bars D, and project downward and outward, so as to allow the rake to turn in one direction only. They serve as props to allow the front bearings, *g*, of the arched pieces G to be adjusted upon the front stop-pins, *h*, on the shaft A at the commencement of gathering every load.

I am aware that the patent granted December 10, 1836, to H. Hunt shows a hay-rake constructed upon the general principle of that which I have improved and above described; but Hunt has shown no means of bracing and strengthening the knee-joints of the rake-frame, nor has he shown any means for tightening said knees when they work loose.

In Figs. 3 and 4 I have represented bolts *s* applied to the tripping-clutches G, and passing through them in a direction at right angles to their length. These clutches are subjected to considerable strain in raking, and as they are made of wood in order to have them light and cheap they are liable to split lengthwise. The bolts *s* above described prevent the clutches from splitting, and do not materially increase their weight. In the same figures I have also shown bolts *r* passing transversely through arms E and entering the tripping-clutches obliquely with the grain of the latter, for the purpose of strengthening the joint between them.

Having described my invention, what I claim as new, and desire to secure by Letters Patent, is—

1. The adjusting-braces, having their front ends secured to the lower sides of the draw-bars D and their rear ends extending through the standards C, with screw-nuts upon these rear ends for tightening up the parts at will, substantially as described.

2. An improved stop, provided with a flange and having a broad face and an oblique adjustment, substantially as described.

A. T. BARNES.

Witnesses:

B. G. ATKINS,

E. C. UMSTED.